United States Patent
Alexander et al.

(10) Patent No.: US 6,614,465 B2
(45) Date of Patent: *Sep. 2, 2003

(54) METHOD AND APPARATUS FOR CONTROLLING A REMOTE VIDEO CAMERA IN A VIDEO CONFERENCING SYSTEM

(75) Inventors: Theresa A. Alexander, Hillsboro, OR (US); Lewis V. Rothrock, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 105 days.

This patent is subject to a terminal disclaimer.

(21) Appl. No.: 09/982,675

(22) Filed: Sep. 13, 2001

(65) Prior Publication Data

US 2002/0044201 A1 Apr. 18, 2002

Related U.S. Application Data

(63) Continuation of application No. 09/003,404, filed on Jan. 6, 1998.

(51) Int. Cl.$^7$ ................................................. H04N 7/14
(52) U.S. Cl. ................................. 348/14.05; 348/14.08
(58) Field of Search .......................... 348/14.01–14.03, 348/14.05, 14.07–14.12, 143, 152, 169, 211.12, 214, 240, 722; 379/102.01–102.03, 202; 382/103–104, 106, 153–154, 190, 194–195, 203; 345/640, 660, 788, 798, 800

(56) References Cited

U.S. PATENT DOCUMENTS

| | | | |
|---|---|---|---|
| 4,491,879 A | 1/1985 | Fine | 360/14.1 |
| 4,703,369 A | 10/1987 | Moriyama et al. | 358/343 |
| 5,099,337 A | 3/1992 | Cury | 358/335 |
| 5,206,929 A | 4/1993 | Langford et al. | 395/159 |
| 5,262,877 A | 11/1993 | Otsuka | 358/343 |
| 5,289,288 A | 2/1994 | Silverman et al. | 358/335 |
| 5,448,372 A | 9/1995 | Axman et al. | 358/342 |
| 5,508,940 A | 4/1996 | Rossmere et al. | 364/514 A |
| 5,526,020 A | * 6/1996 | Campanelli et al. | 382/165 |
| 5,532,845 A | 7/1996 | Gusmano | 358/474 |
| 5,546,125 A | * 8/1996 | Tomitaka et al. | 348/169 |
| 5,548,346 A | 8/1996 | Mimura et al. | 348/738 |
| 5,577,130 A | 11/1996 | Wu | 382/106 |
| 5,598,209 A | * 1/1997 | Cortjens et al. | 348/211.12 |
| 5,636,073 A | 6/1997 | Yamamoto et al. | 360/13 |

(List continued on next page.)

OTHER PUBLICATIONS

Comer, Mary L., et al., "Multiresolution Image Segmentation," Proceedings of the 1995 IEEE International Conference on Acoustics, Speech, Detroit, Michigan, pp. 2415–2418 (May 9–12, 1995).

Cook, Gregory W., et al., "Multiresolution Sequential Edge Linking," Proceedings of the IEEE International Conference on Image Processing, Washington, D.C., pp. 41–44 (Oct. 23–26, 1995).

(List continued on next page.)

*Primary Examiner*—George Eng
(74) *Attorney, Agent, or Firm*—Blakely, Sokoloff, Taylor & Zafman LLP

(57) ABSTRACT

An apparatus for use within a video conferencing system comprising an image analysis circuit and a control circuit is presented. As described herein, the image analysis circuit is operative to analyze at least a video frame of video conferencing signals of a video conference. The control circuit, coupled to the image analysis circuit, is operative to control a remote video camera of a remote conferencing apparatus communicatively coupled to the video conferencing apparatus to conduct the video conference, responsive to the results of said analysis.

20 Claims, 7 Drawing Sheets

U.S. PATENT DOCUMENTS

| | | | |
|---|---|---|---|
| 5,706,416 A | 1/1998 | Mann et al. | 395/127 |
| 5,715,412 A | 2/1998 | Aritsuka et al. | 395/326 |
| 5,719,622 A | 2/1998 | Conway | 348/211 |
| 5,745,161 A | 4/1998 | Ito | 348/15 |
| 5,752,113 A | 5/1998 | Borden | 396/428 |
| 5,754,697 A | 5/1998 | Fu et al. | 382/232 |
| 5,809,182 A | 9/1998 | Ward et al. | 382/298 |
| 5,812,193 A | 9/1998 | Tomitaka et al. | 348/369 |
| 5,835,671 A | 11/1998 | Kitamura et al. | 386/97 |
| 5,838,368 A | 11/1998 | Masunaga et al. | 348/211 |
| 5,852,438 A | 12/1998 | Tomizawa et al. | 345/328 |
| 5,880,782 A | 3/1999 | Koyanagi et al. | 348/364 |
| 5,912,980 A * | 6/1999 | Hunke | 382/103 |
| 6,055,334 A * | 4/2000 | Kato | 382/190 |
| 6,157,385 A | 12/2000 | Oxaal | 345/427 |
| 6,380,968 B1 * | 4/2002 | Alexander et al. | 348/14.05 |
| 6,486,909 B1 * | 11/2002 | Pirim | 348/143 |

OTHER PUBLICATIONS

Eastman Kodak Company, "FlashPix Executive Summary," 3 pages (accessed over the Internet at www.kodak.com on Feb. 12, 1999).

Eastman Kodak Company, "FPX Executive Summary," 4 pages (accessed over the Internet at www.kodak.com on Sep. 28, 1999).

Eastman Kodak Company, FPX File Size and Capabilities, 2 pages (accessed over the Internet at www.kodak.com on Sep. 28, 1999).

Eicher, Paul, et al., "Sequential Edge Detection in Correlated Random Fields, "Proceeding of the IEEE Computer Vision and Pattern Recognition Conference, San Francisco, California, pp. 14–21 (Jun. 1985).

Enroute product information for QuickStitch™ and QuickStitch™ 360, 5 pps. (accessed over the Internet at www.enroute.com on Sep. 28, 1999).

Live Picture, Inc. product information for PhotoVista™, 3 pps. (accessed over the Internet at www.livepicture.com on Sep. 28, 1999).

Mallat, Stephane, et al., "Characterization of Signals from multiscale Edges,"IEEE Transactions on Pattern Analysis and Machine Intelligence, vol. 14, No. 7, pp. 710–732 (Jul. 1992).

Microsoft Corporation product information for Picture It!, 18 pps. (accessed over the Internet at www.microsoft.com on Oct. 19, 1999).

Panorama, 15 pps. (accessed over the Internet at www.pictureworks.com on Oct. 19, 1999).

PictureWorks Technology, Inc., "Spin™ by PictureWorks Turning the Imaging Industry Around", 3 pps. (Mar. 31, 1997).

Rosenfeld, Azriel, et al., "Edge and Curve Detection for Visual Scene Analysis, "IEEE Transactions on Computers, vol. C–20, No. 5, pp. 562–569 (May 1971).

Proceedings of the ACM Multimedia Conference, Anaheim, California 8 pps. (Aug. 1993).

Wilson, R., et al., "Kernel Designs for Efficient Multiresolution Edge Detection and Orientation Estimation,"IEEE Transactions on Pattern Analysis and Machine Intelligence, vol. 14, No. 3, pp. 384–390 (Mar. 1992).

* cited by examiner

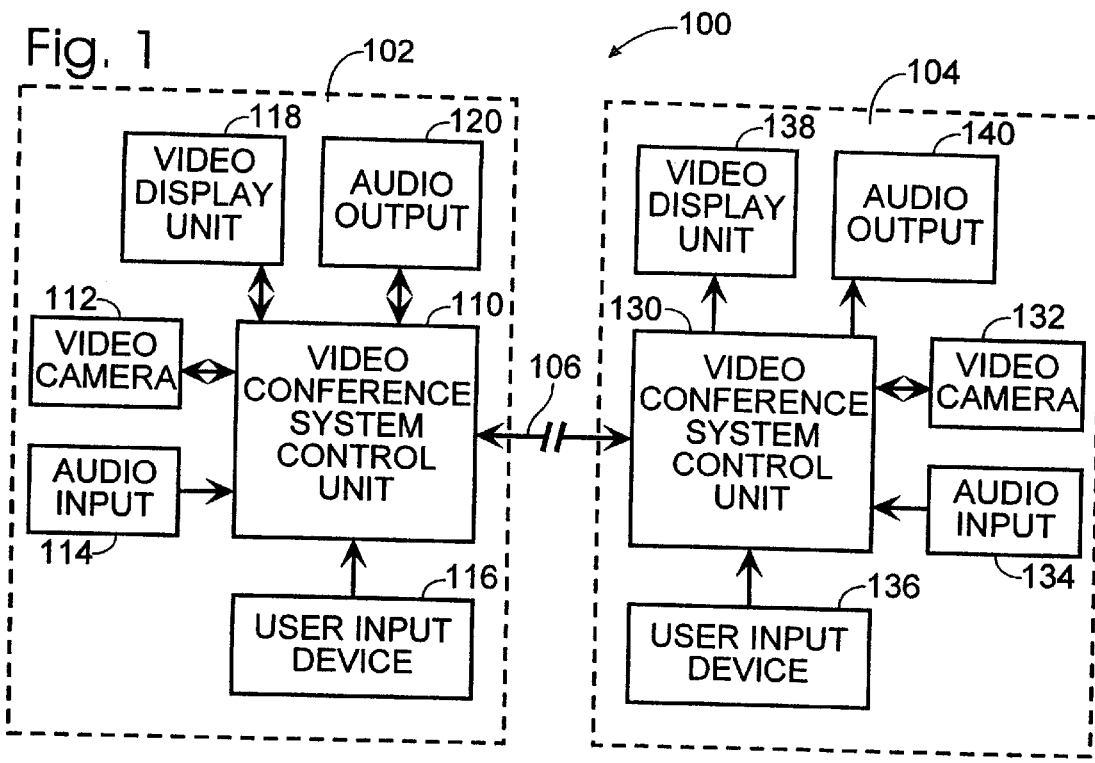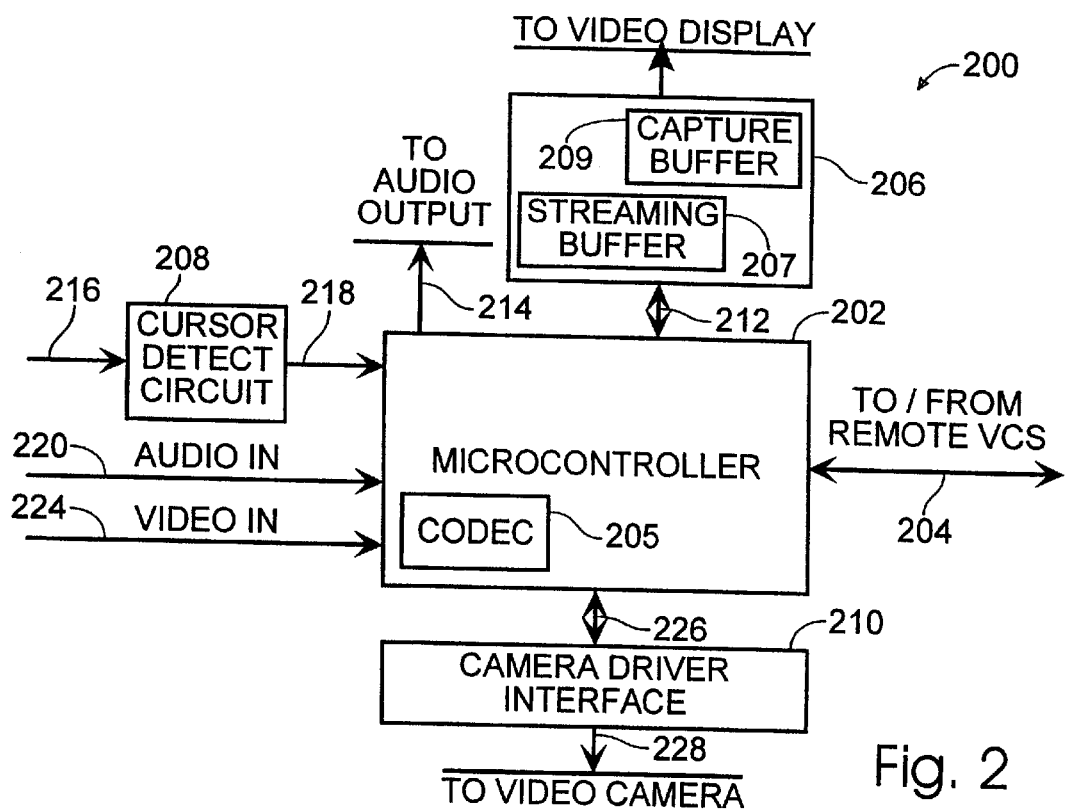

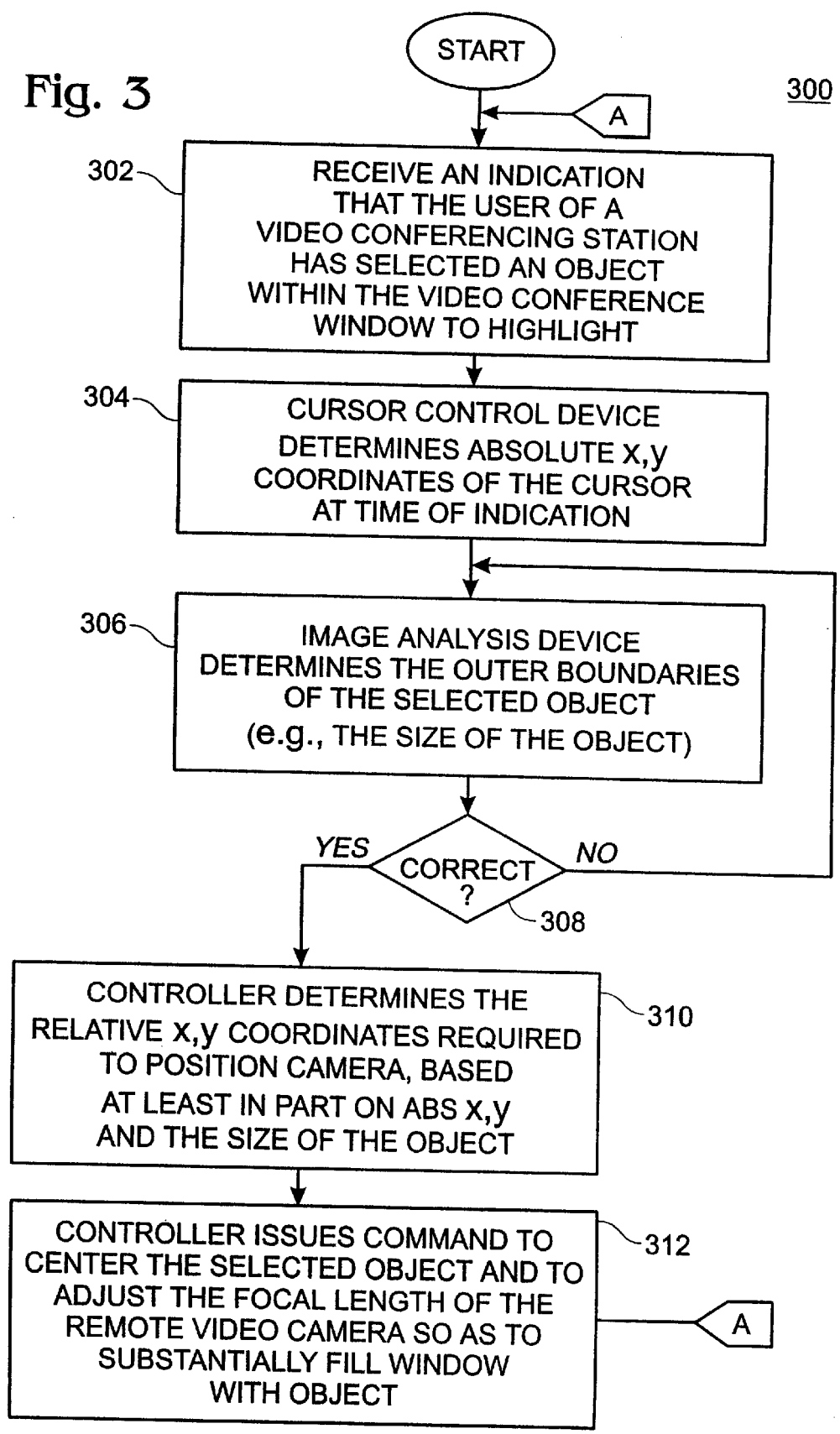

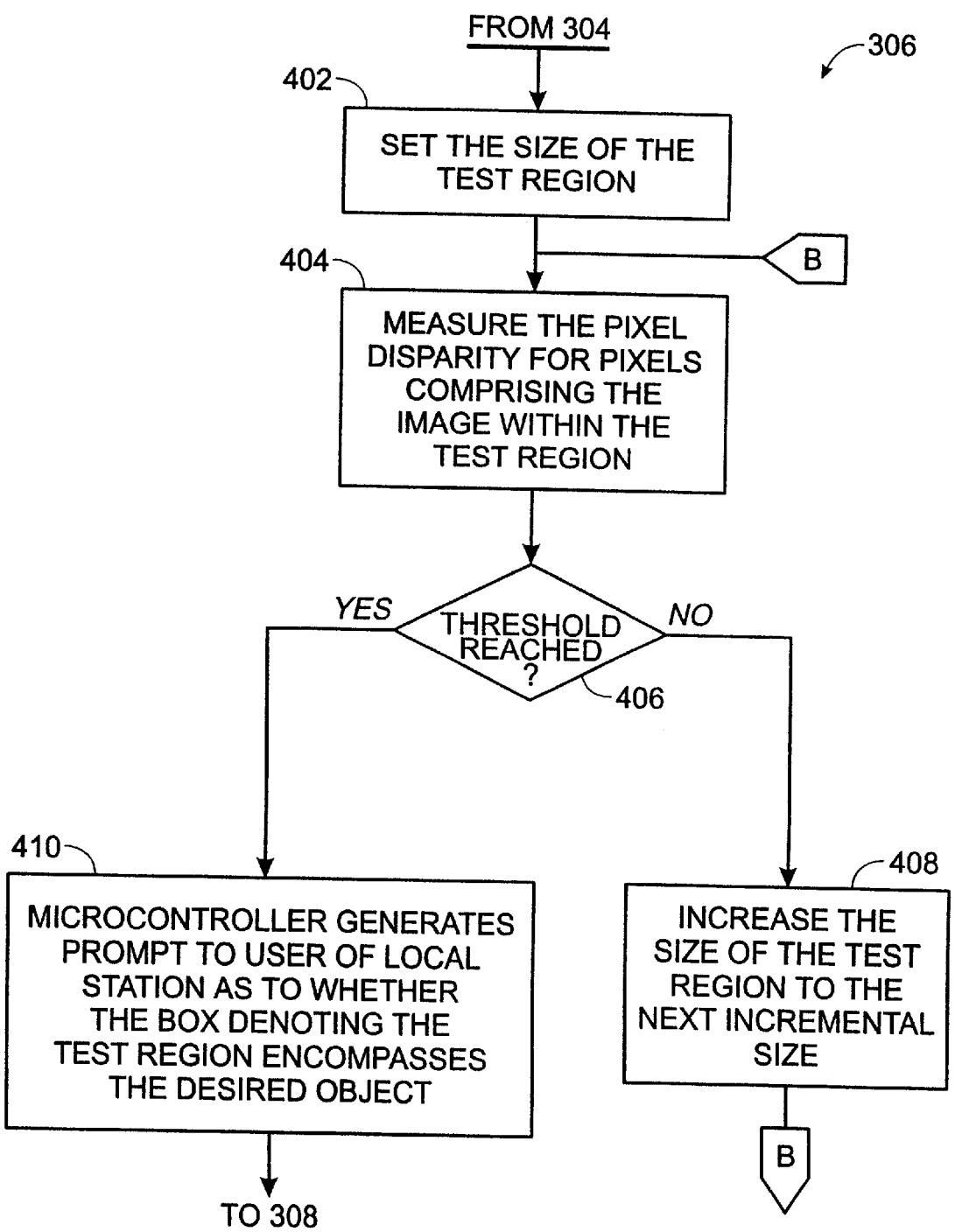

METHOD AND APPARATUS FOR CONTROLLING A REMOTE VIDEO CAMERA IN A VIDEO CONFERENCING SYSTEM

CROSS REFERENCE TO RELATED APPLICATIONS

This continuation application claims the priority of application Ser. No. 09/003,404, filed Jan. 6, 1998.

BACKGROUND OF THE INVENTION

1. Field of the Invention

The present invention generally relates to the field of video conferencing and, more particularly, to a method and apparatus for controlling a remote video camera in a video conferencing system.

2. Background Information

Video conferencing systems are known in the art. Video conferencing systems are available in a wide range of systems with a corresponding variety of features and capabilities. Personal computer (PC) video conferencing systems, for example, offer a flexible video conferencing solution to the masses. That is, with the addition of a video/sound board and a PC video camera, a standard home/business computer system may be transformed into a video conferencing system, while retaining all of the standard computing capability inherent in the computer system. Even within the market of PC video conferencing systems, the capabilities and features vary between vendors and between market price points within a vendor's offerings. For example, the ProShare# Video Conferencing system from Intel Corporation provides a personal computer with the ability to engage in a video conference with other compatibly enabled computer(s). With the ProShare# and most other PC video conferencing systems, a video camera sits atop the computer monitor and points in the general vicinity of the local user. In more advanced PC video conferencing systems, the focal length of the local video camera may be controller by the local user to zoom in/out. That is, the local user may adjust the focal length of the local camera (e.g., zoom in/out) to control the size of the image depicted within the video conference window of the remote video display unit.

Stand alone video conferencing systems (or, dedicated video conferencing systems) are also well known, and also offer a broad range of video conferencing features and capability. In general, many of the stand alone video conferencing systems include camera control systems at either end of the video conferencing system, allowing local users with a remedial ability to manually control the remote video camera.

These prior art systems, however, require that a local user manually adjust the field of focus (e.g., "pan", "steer", or otherwise position) the remote video camera to locate the actual remote speaker, manually "frame" the speaker (e.g., center the image within the frame of the video window) and adjust the focal length (e.g., zoom) of the remote video camera via some sort of local camera control mechanism (e.g., keyboard control). Novice users of such video conferencing systems find, however, that the camera control mechanism of these prior art conferencing systems are not intuitive or easy to use. They often have a lag time associated with their operation, thereby causing the remote video camera to "overshoot" the desired object when panning to view a particular object. In addition, many of the prior art camera's also required the user to manually focus and/or zoom the camera when the object of interest was ultimately framed. These and other shortcomings of the prior art made their use inefficient, e.g., conference participants spent an inordinate amount of time positioning the camera equipment, causing many potential conference participants to opt for alternative conferencing mediums with which to conduct their conference.

In response, manufacturers of video conferencing system have introduced automated video camera control systems which obviate the need for manual control by conference participants. Many of these automated video camera control systems rely on a network of distributed microphones to locate a speaking conference participant within a room, and an "auto-focus" camera system to ensure the clarity of the picture. Such advanced features, however, are typically offered only in the expensive, high-tier product offerings. Further, the accuracy of these automated video camera control systems are greatly dependent upon the number of microphones used in the system, the distribution of these microphones, and the number of video conference participants. That is, if the video conferencing station has only two microphones, the accuracy of the automated video camera controller is quite limited, even if the microphones are widely distributed (e.g., opposite sides of the room). Further, the accuracy of these prior art automated camera control systems is inversely related to the number of conference participants. That is, the accuracy of the automated camera control systems is diminished as the number of simultaneous speakers increases.

Thus, an improved camera control system is desired that is unencumbered by the deficiencies and limitations commonly associated with the prior art.

SUMMARY OF THE INVENTION

In accordance with the teachings of the present invention, a method and apparatus for the control of a remote video camera is disclosed. In a first example embodiment of the present invention for controlling a remote video camera, an apparatus for use within a video conferencing system comprising an image analysis circuit and a control circuit is presented. As described herein, the image analysis circuit is operative to analyze at least a video frame of video conferencing signals of a video conference. The control circuit, coupled to the image analysis circuit, is operative to control a remote video camera of a remote conferencing apparatus communicatively coupled to the video conferencing apparatus to conduct the video conference, responsive to the results of said analysis.

BRIEF DESCRIPTION OF DRAWINGS

The present invention will be described by way of exemplary embodiments, but not limitations, illustrated in the accompanying drawings in which like references denote similar elements, and in which:

FIG. 1 is a block diagram illustration of an example video conferencing system incorporating the teachings of the present invention;

FIG. 2 is a block diagram illustration of an example video conference system control unit incorporating the teachings of the present invention, in accordance with one embodiment of the present invention;

FIG. 3 is a flow chart illustration of an example method for controlling a remote video camera in a video conferencing system, in accordance with one embodiment of the present invention;

FIG. 4 is a flow chart illustration of an example method for detecting and identifying an object selected by a user of a video conference system control unit incorporated with the teachings of the present invention, in accordance with one embodiment of the present invention;

DETAILED DESCRIPTION OF THE INVENTION

Figure 5:
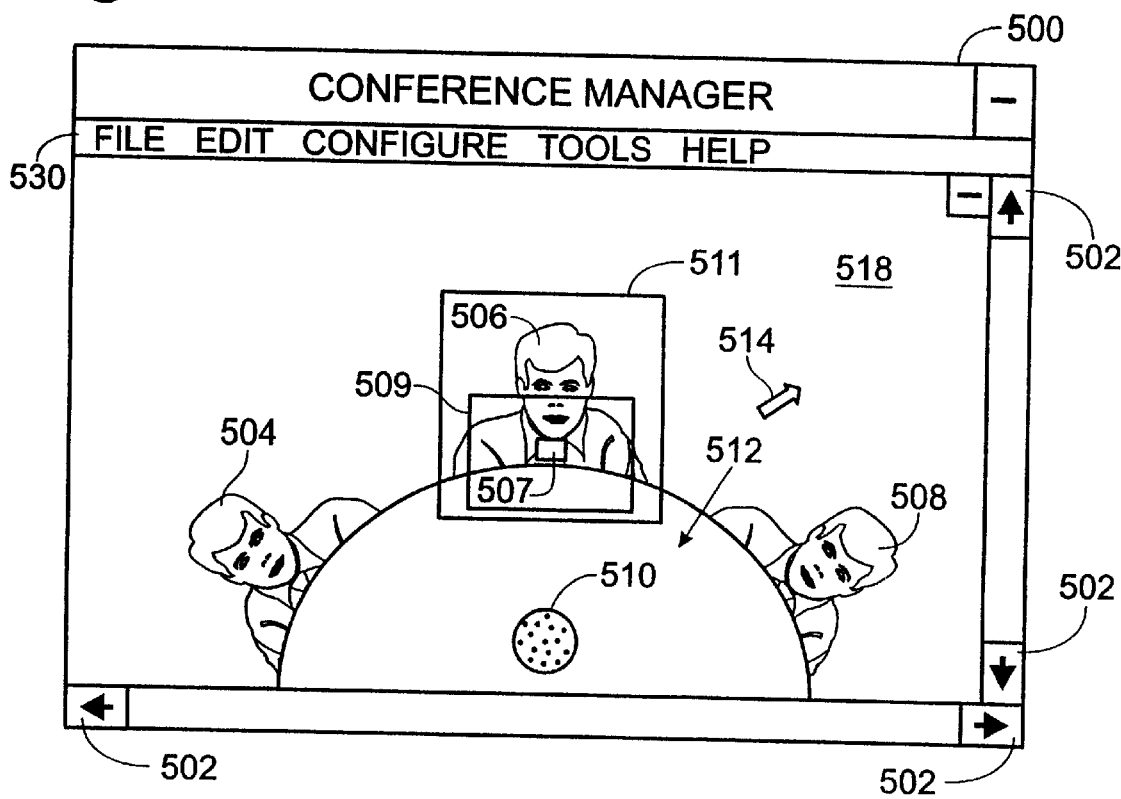
FIG. 5 is an illustration of an example video display of a conference manager application, in accordance with one embodiment of the present invention.

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention. Furthermore, for the method steps of the present invention, for ease of explanation, certain method steps are described with multiple method steps "in sequence", however, they should not be construed as necessarily order dependent in their performance.

Referring now to FIG. 1, a block diagram illustrating an example video conferencing system 100 incorporating the teachings of the present invention is depicted. In accordance with the illustrated example embodiment of FIG. 1, video conferencing system 100 is shown comprising two video conferencing stations, video conferencing station 102 and video conferencing station 104, communicatively coupled via communication channel 106. As will be described in greater detail below, a video conferencing station (e.g., video conferencing station 102 or video conferencing station 104) incorporating the teachings of the present invention enables a user of one of the video conferencing stations (e.g., video conferencing station 102) to automatically adjust the field of focus and focal length of a remote video camera of a remote video conferencing station (e.g., video conferencing station 104) by "selecting" an object displayed within a video conference window displayed on a local video display unit with a user input device. Thus, in accordance with the teachings of the present invention, a user of a video conferencing station need not master the intricate control necessary to efficiently control a remote video camera, or invest in the expensive automated camera control systems typical of prior art video conferencing systems. Rather, a video conference control unit endowed with the teachings of the present invention, to be described more fully below, allows a user to simply select an object with a user input device with which the user is familiar, and the video conference control unit automatically causes the remote camera to be positioned to properly frame the object, and zoom in on the object until the object substantially fills the video conferencing window.

As illustrated in the example embodiment of FIG. 1, video conferencing station 102 is shown comprising video conference system control unit 110 incorporating the teachings of the present invention, video camera 112, video display unit 118, audio input device 114, audio output 120 (e.g., speaker(s)) and user input device 116, each communicatively coupled as depicted. Similarly, video conferencing station 104 is depicted comprising video conference system control unit 130 incorporating the teachings of the present invention, video camera 132, video display unit 138, audio input device 134, audio output 140 (e.g., speaker(s)) and user input device 136, each communicatively coupled as depicted.

Although video conferencing system 100 is depicted comprising two (2) video conferencing stations, those skilled in the art will appreciate that this is for illustrative purposes only, as the teachings of the present invention in no way limits the number of video conferencing stations a video conferencing system may include. Consequently, FIG. 1 might well be depicted comprising a plurality of video conferencing stations, with up to a corresponding plurality of the video conferencing stations incorporated with the teachings of the present invention.

In accordance with the illustrated example embodiment of FIG. 1, video conferencing station 102 is depicted as communicatively coupled to video conferencing station 104 via communication channel 106, which is operative to transport the video conferencing signals between any of a plurality of video conferencing stations including video conferencing station 102 and video conferencing station 104. In accordance with the example embodiment of FIG. 1, communication channel 106 is intended to represent a broad category of wireline and wireless communication channels known in the art. For example, communication channel 106 may be a plain old telephone services (POTS) channel, an Integrated Services Digital Network (ISDN) channel, a channel within an T1 or E1 trunk line, Internet communication channel, intranet communication channel, or any of a number of alternate wireline communication channels. In an alternate embodiment, communication channel 106 represents a broad category of wireless communication channels including, but not limited to, a cellular communication channel, a personal communication services (PCS) channel, a two-way paging channel, a microwave communication channel, a satellite communication channel, and the like. In yet another embodiment, communication channel 106 is intended to represent a combination of wireline and wireless communication channels, wherein at one end-point, e.g., video conferencing station 102, communication channel 106 is a wireline communication channel, whereas at another end-point, e.g., video conferencing station 104, communication channel 106 is a wireless communication channel. Similarly, communication channel 106 is intended to transport video conferencing signals adhering to any of a number of video conferencing standards known in the art such as, for example, the H.323 standard for "Visual Telephone Systems and Equipment for Local Area Networks Which Provide a Non-Guaranteed Quality of Service" (November, 1996), the T.120 standard entitled "Data Protocols for Multimedia Conferencing" (July, 1996) (and its associated standards), each promulgated by the International Telecommunications Union (ITU).

Video display unit 118 and 138 are used to display data and video images. Video display unit 118 and 138 are intended to represent a broad category of displays known in the art including, but not limited to, computer monitors, televisions, flat panel displays, liquid crystal displays, and the like. Similarly, video camera 112 and 132 are also intended to represent any of a number of alternative video cameras known in the art. Video camera 112 and 132 are used to capture and convert video images of the user of video conferencing stations 102 and 104, respectively, into video conferencing signals for video conferencing stations 104 and 102, respectively. As will be described in greater detail below, to take fill advantage of the teachings of the present invention, video camera 112 and 132 have zoom capability, i.e., video camera 112 and 132 are endowed with the ability to adjust the focal length of the lenses comprising the video camera to make the image captured by the video camera appear larger (or smaller) to the user. Similarly, a video conferencing station incorporating the teachings of the present invention has the ability to adjust the field of focus, i.e., aim, of the video camera (e.g., video camera 112 or 132). In one embodiment, video camera 112 and 132 are endowed with a "drive" that may receive control commands adjusting the field of focus. In an alternate embodiment, video camera 112 and 132 are resting atop a "turntable" capable of receiving control commands to adjust the field of focus of the video camera. In yet another embodiment, video camera 112 and 132 are configured with movable lenses which enables the field of focus of the video camera to be adjusted horizontally.

Audio input device 114 and 134 (e.g., a microphone) perform their conventional functions of capturing and rendering audio. Similar to video display units 118 and 138, audio input device 114 and 134 and audio output device 120 and 140 (e.g., speaker(s)) are intended to represent a broad category of these elements found in video conferencing systems. Similarly, user input device 116 and 136 are intended to represent a wide variety of user input devices known in the art including, but not limited to, a mouse, a track ball, an integrated keyboard including a pointing device (e.g., touchpad or trackball) and the like.

While for ease of explanation, video display unit 118 and 138, video camera 112 and 132, audio input 114 and 134, and audio output 120 and 140 are each illustrated as separate functional blocks within example video conferencing system 100, those skilled in the art will appreciate that any combination of these functions may be combined and embodied in the same physical unit in any number of ways. For example, audio input 114 and audio output 120 may well be combined into a single "headset", whereas video display unit 118 and video camera 112 may be embodied in a single display with "hidden" camera. Similarly, video display unit 118 may well be a multimedia video display unit comprising an audio input device, speakers and a video camera.

As will be described in greater detail below with reference to FIG. 2, a video conference system control unit incorporated with the teachings of the present invention (e.g., video conference system control unit 110 and/or video conference system control unit 130) enables a user of the video conferencing station to automatically control the field of focus and the focal length of a communicatively coupled remote video camera by simply selecting an object displayed within a video conference window of a video display unit with a user input device. In addition to the teachings of the present invention, to-be described more fully below, video conference system control units 110 and 130 perform their respective functions known in the art to establish and facilitate a video conferencing session between one or more remote video conferencing stations.

Turning to FIG. 2, a block diagram illustrating one example embodiment of a video conference system control unit 200 incorporating the teachings of the present invention is depicted. In accordance with one embodiment of the present invention, video conference system control unit 200 may well be beneficially incorporated into video conferencing system 100 as video conference system control unit 110 and/or 130. As depicted in the illustrated example embodiment of FIG. 2, video conference system control unit 200 is shown comprising microcontroller 202, image analysis circuit 206, cursor detect circuit 208 and camera drive interface 210 communicatively coupled as depicted. Although depicted as separate elements, those skilled in the art will appreciate that any or all of image analysis circuit 206, cursor detect circuit 208 and camera drive interface 210 may well be incorporated into a common device, e.g., microcontroller 202. Further, microcontroller 202 is intended to represent any of a number of alternative controllers available in the art including, but not limited to, microcontrollers, processors, dedicated Application Specific Integrated Circuit (ASIC), and the like.

As illustrated in FIG. 2, microcontroller 202 receives audio signals from a local audio input device (e.g., audio input 114) via audio line 220, while video signals are received from a local video input device (e.g., video camera 112) via video line 224. Upon receiving the local audio/video signals via lines 220 and 224, respectively, microcontroller 202 configures the signals for transmission to a remote video conferencing station (not shown) via line 204. In one embodiment, microcontroller 202 configures the signals for transmission in accordance with any of a number of alternative video conferencing standards, some of which being described above. In particular, microcontroller 202 receives the local audio/video signals, digitizes the signals (if not already digitized by the audio input device or video input device) and compresses/formats the signals with a compression/decompression scheme (CODEC) (205) in accordance with any of a number of alternative CODEC schemes. Insofar as the digitizing/compression of audio/video signals is known to those skilled in the art, it need not be further described here.

Similarly, microcontroller 202 receives audio and video signals from a remote video conferencing system (not shown) via communication channel 204. In one embodiment, the audio signals and the video signals are separate and distinct, whereas in an alternate embodiment, the audio and video signals are received as a composite audio/video (A/V) signal. In the illustrated example embodiment, microcontroller 202 may beneficially receive such signals in either format. The received signals are processed by microcontroller 202, wherein microcontroller 202 decompresses the received audio and video signals via the CODEC described above, as appropriate, and forwards them to the audio output device(s) and image analysis circuit 204, to be discussed more fully below, before rendering by video output device(s) (e.g., video display units), as appropriate.

In addition, microcontroller 202 receives, via cursor detect circuit 208 an indication from a user of video conference system control unit 200 input indicating whether the user intends to pan and zoom-in on an object, or whether the user intends to return to the camera position/focal length immediately preceding the last zoom. In accordance with one embodiment of the present invention, wherein the user input device is a mouse, a "double click" of a mouse button is indicative of the user's desire to pan and zoom-in on the object corresponding to the cursor position when the interrupt is received. Consequently, microcontroller 202 stores the current camera position information and, based on the description to follow, issues a command to the remote video camera to pan and zoom in on the selected object. Alternatively, a "single click" of the mouse button is indicative of the user's desire to return to the camera state immediately preceding the last zoom-in. Consequently, microcontroller 202 issues a command to the remote video camera to return to the state immediately preceding the last pan/zoom (e.g., the stored camera position information). Those skilled in the art will appreciate, however, that there are finite limits to the amount of "panning" and "zooming" such a system may accommodate. Accordingly, if microcontroller 202 receives an input it cannot accommodate, the input is disregarded.

In accordance with one embodiment of the present invention, cursor detect circuit 208 receives an interrupt from a user input device (e.g., user input device 116) and determines the nature of the interrupt, instructing microcontroller 202 accordingly via line 218. If the interrupt denotes a "double click" of the mouse button, cursor detect circuit 208 automatically determines the position of a cursor displayed on a projected image of a video display unit (e.g., video display unit 118). In accordance with one embodiment of the present invention, cursor detect circuit 208 uses techniques well known in the art to determine cursor position via the video refresh interval of the video display unit. In simplistic terms, cursor detect circuit 208 measures, upon receiving an interrupt, the time required by a video display to render the cursor, and compares the measured time against a known video refresh interval to ascertain the position of the cursor on the video display. In an alternate embodiment, cursor detect circuit 208 receives input from the user input device, e.g., user input device 116, in the form of absolute x,y coordinates which cursor detect circuit 208 uses to ascertain the position of the cursor on the video display unit. Accordingly, those skilled in the art will appreciate that a number of alternative cursor detection schemes may well be beneficially employed by cursor detect circuit 208 to ascertain the position of a cursor on the video display unit.

In accordance with the teachings of the present invention, image analysis circuit 206 receives the x,y coordinates corresponding to the determined position of the cursor from cursor detect circuit 208 via microcontroller 202 and lines 218 and 212. In accordance with the illustrated example embodiment of the present invention, image analysis circuit 206 is shown comprising streaming buffer 207 and capture buffer 209. As depicted herein, streaming buffer 207 buffers the video output to be displayed by the video display unit. The amount of video data buffered is preferably kept to a minimum, e.g., a single frame, so as to not interfere with the synchronization between the audio and video content to be output. That is, the amount of information buffered does not interfere with the perceived synchronization between the video output and the audio output. Upon receiving an interrupt, the video data buffered in streaming buffer 207 is forwarded to capture buffer 209 for analysis. Although image analysis circuit 206 is depicted comprising streaming buffer 207 and capture buffer 209, those skilled in the art will appreciate that more or less buffers may well be used without deviating from the spirit and scope of the present invention.

Given the x,y coordinates corresponding to the cursor, image analysis circuit 206 analyzes the image stored in capture buffer 209 at and around the x,y coordinates to identify an object within the video conference window corresponding to the ascertained position of the cursor. In one embodiment of the present invention, image analysis circuit 206 analyzes the pixels comprising the image displayed within the video conference window of the video display unit around the x,y coordinates corresponding to the determined cursor position. That is, image analysis circuit 206 analyzes each of the pixels within a subset region (i.e., a test region) of the image to quantify the difference between pixels in the test region. As described herein, pixel disparity any of a number of alternative approaches to measuring the dissimilarity between individual pixels within an image. For example, in one embodiment pixel disparity is a measure of the color disparity between the pixels within the test region. In another embodiment, pixel disparity is a measure of the brightness disparity and/or hue disparity between pixels within the test region. In yet another embodiment, pixel disparity is a measure of the difference in texture between pixels within the test region.

It should be appreciated, from the description to follow, that image analysis circuit 206 identifies an object corresponding to the identified cursor position by measuring the pixel disparity within a test region. If the pixel disparity within the test region does not exceed a predetermined threshold, the size of the test region is increased, and the pixel disparity is again measured. The size of the test region will be increased, in a step-wise fashion, until the pixel disparity within the test region exceeds the predetermined threshold, denoting that the desired object has been framed by test region. Once the disparity between pixels has reached the predetermined threshold, image analysis circuit 206 signals microcontroller 202 with information regarding the center of the test region (e.g., loosely corresponding to the center of the identified object) and the maximum and minimum x,y coordinates of the test region from which microcontroller 202 determines an appropriate focal length.

As illustrated in the example embodiment of FIG. 2, video conference system control unit 200 also includes camera drive interface 210. Camera drive interface receives commands from microcontroller 202 to position a local video input device (e.g., a video camera). In one embodiment, camera drive interface 210 receives camera control signals from a remote video conferencing station and positions the field of focus for an affixed video camera (not shown) in accordance with the commands received from the remote video conferencing station. In accordance with the illustrated example embodiment of FIG. 2, camera drive interface 210 receives field of focus and focal length commands from a remote video conferencing station, adjusts the field of focus for an affixed video camera, and forwards the focal length commands to invention, camera drive interface 210 translates foreign commands, e.g., received commands that are not in an appropriate format for an affixed video camera, to an appropriate corresponding command recognizable by the affixed video camera. Accordingly, in one embodiment, camera drive system 210 includes a database (not shown) of commands corresponding to a number of alternative video cameras that may be beneficially controlled by camera drive system 210. In an alternate embodiment, the video camera can be identified through a start-up protocol embedded within the video conferencing applications, wherein each of participating video conferencing stations automatically exchange system configuration information regarding each of the video conferencing systems. In accordance with this alternate embodiment, given the system configuration information of each of the participating video conferencing stations, a video conferencing station simply selects an appropriate messaging protocol for each of the participating video conferencing stations.

Given the foregoing architectural description of the example video conference system control unit, an example method for controlling a remote video camera in a video conferencing system is depicted in the flow chart depicted in FIG. 3. For ease of explanation, and not limitation, the operation of video conference system control unit 200 of FIG. 2 will be developed with reference to the example flow chart depicted in FIG. 3 and continued reference to FIG. 1. In particular, the operation of video conference system control unit 200 will be described in the context of an example video conferencing session wherein video conferencing station 102 is referenced as the local video conferencing station, and video conferencing station 104 is referenced as the remote video conferencing station having remote video camera 132.

Accordingly, the example method of FIG. 3 begins with the initial step of receiving an indication from a local user input device (e.g., user input device 116) that the user of local video conferencing station 102 has selected an object within the video conference window to feature, step 302. More specifically, an interrupt is sent from user input device 116 when so instructed by the user of local video conferencing station 102. In one embodiment, for example, user input device 116 is a "mouse", and the interrupt is generated when the user performs a double click of a control button on the mouse.

Having received the indication from user input device 116 via line 216, cursor detect circuit 208 signals microcontroller 202, which instructs image analysis circuit 206 to transfer the current image buffered in streaming buffer 207 to capture buffer 209. Simultaneously, in accordance with one embodiment of the present invention, cursor detect circuit 208 determines the absolute x,y coordinates of the cursor position, as described above, step 304. Having determined the x,y coordinates of the cursor position, step 304, cursor detect circuit 208 provides image analysis circuit 206 with the determined x,y coordinates via the microcontroller 202 and lines 218 and 212, whereupon image analysis circuit 206 begins an analysis of the image buffered in capture buffer 209, step 306. One example method for identifying the selected object within the image is presented in the flow chart of FIG. 4.

With reference to FIG. 4, an example method for identifying an object through pixel differentiation, step 306, is depicted. In accordance with the illustrated example embodiment of the present invention, image analysis circuit 206 iteratively analyzes an increasingly large subset (hereafter, test region) of the image stored in capture buffer 209 immediately surrounding the x,y coordinates associated with the position of the cursor. In step 402, image analysis circuit 206 sets the size of the test region, i.e., the subset of the entire image buffered in capture buffer 209. In a first iteration, image analysis circuit 206 sets the test region to immediately encompass the x,y coordinates associated with the identified cursor position. Having set the test region in step 402, image analysis circuit 206 measures the disparity between any of a number of pixel characteristics for pixels comprising the image within the test region, step 404. In one embodiment, for example, image analysis circuit 206 measures the color disparity between pixels comprising the image within the test region. More specifically, in accordance with one embodiment of the present invention, image analysis circuit 206 assigns each pixel within the test region a value based upon the color of the pixel. For example, white (at one end of the scale) receives a value of 1, whereas black (at the other end of the scale) receives a value of 9, with any number of degradation's in between. Having assigned each of the pixels within the test region a value based upon the color of the pixel, image analysis circuit 206 calculates the percent deviation (pixel disparity) within the test region. In one embodiment, image analysis circuit 206 calculates a standard deviation for the "population" of pixel values comprising the image within the test region, wherein the greater the standard deviation, the greater the pixel disparity. In accordance with one embodiment of the present invention, the greater the pixel disparity, the greater the likelihood that the entire object has been captured within the test region, and additional (perhaps background) objects are beginning to occupy a greater percentage of the test region (accounting for the greater pixel disparity).

Suppose, for example, that the image stored in video capture buffer 209 is that of a woman wearing a blue blouse sitting in a white room, wherein the user of local video conferencing station 102 selected the middle of the blue blouse and issued a double click of the mouse. Image analysis circuit 206 begins the analysis with a test region immediately surrounding the identified cursor position. Insofar as all of the pixels comprising the population within the test region are blue, the standard deviation (or, pixel disparity) of the pixels in the test region will be quite small. As the test region increases beyond the blue blouse to begin to encompass the white room, the standard deviation (pixel disparity) of the population of pixel values will increase. Once the standard deviation has increased to a predetermined threshold point, image analysis circuit 206 concludes that the test region encompasses both the blue blouse as well as the background.

Thus, in step 406, image analysis circuit 206 determines whether the predetermined threshold has been reached. If so, image analysis circuit 206 generates a contrasting border denoting the current test region and microcontroller issues a prompt to the user of the local video conferencing station 102 as to whether the contrasting border displayed adequately encompasses the desired object, step 410, and the process continues with step 308 (FIG. 3).

If, however, image analysis circuit 206 determines that the predetermined threshold has not been reached, step 406, image analysis circuit 206 increases the test region to the next incremental size, step 408. As illustrated in the example embodiment of FIG. 4, once the size of the test region has been increased, the process continues with step 404 wherein image analysis circuit 206 measures the pixel disparity for the pixels comprising the image within the test region. Accordingly, the method of FIG. 4 continues until image analysis circuit 206 determines, in step 406, that the predetermined threshold has been reached.

Returning to the illustrated example embodiment of FIG. 3, microcontroller 202 determines whether the user of local video conferencing station 102 accepts the contrasting boundary of the test region as sufficiently encompassing the desired object to be featured, step 308. If, in step 308, it is determined that the test region does not encompass the desired object, the process returns to step 306 and image analysis circuit 206 expands the test region to the next incremental size, in accordance with the example embodiment of FIG. 4 and the description of image analysis circuit 206, above. If, however, it is determined in step 308 that the contrasting test region does, indeed, encompass the object desired by the user of local video conferencing station 102, image analysis circuit 206 determines the x,y coordinates corresponding to the "center" of the selected object, as well as the maximum and minimum x and y coordinates of the selected object (e.g., the "size" of the selected object) and passes this information to microcontroller 202, step 310.

Based, at least in part, on the information received from image analysis circuit 206, microcontroller 202 determines the relative x,y coordinates required to adjust the field of focus of the remote video camera so as to center the desired object within the video conference window, and the focal length required to substantially fill the video conference window with the desired object, step 312. In one embodiment of the present invention, microcontroller 202 receives information regarding the current position of the remote video camera from the remote video conferencing station (e.g., video conferencing station 104). Accordingly, in one embodiment of the present invention, microcontroller 202 is periodically updated with the current position of the remote video camera from which to determine the relative x,y coordinates and the focal length required to appropriately adjust the remote video camera's settings. In an alternate embodiment of the present invention, microcontroller 202 determines the current position of the remote video camera (e.g., video camera 132) by issuing a command to remote video conferencing station 104 to provide such information and, given the current settings of the remote video camera, microcontroller 202 determines the relative position and focal length as above.

Having determined the relative x,y coordinates and focal length of remote video camera 132 in step 312, microcontroller 202 issues commands to remote video conferencing station 104 to adjust the field of focus and focal length of video camera 132 so as to center the object within the video conference window of local video display unit 118, and to zoom in on the object until the object substantially fills the video conference window. In one embodiment of the present invention wherein video conference system control unit 200 is beneficially incorporated into video conferencing system 100 as video conference system control unit 110, for example, microcontroller 202 issues a command to remote video conference system controller 130 to position the field of focus of remote video camera 132, beneficially affixed to a camera drive system (not shown) controlled by video conference system control unit 130. One example of the commands issued by microcontroller 202 are depicted as commands (1), (2) and (3), below.

| | | |
|---|---|---|
| Cam_pos: 132,−75; | | (1) |
| In: X %; | | (2) |
| Out: Y % | | (3). |

As depicted, the "Cam_pos" command, above, is issued by microcontroller 202 to position a camera in the x and y direction. As illustrated above, the Cam_pos command (1) will cause a remote video camera to move 132 units to the right, and 75 units down from its current position, as determined by microcontroller 202. The "In" command (2), above, issued by microcontroller 202 causes a remote video camera to decrease the focal length to the displayed object by X%, thereby increasing the relative size of the displayed object within the video conference window by a corresponding X%. Alternatively, the "Out" command (3), above, issued by microcontroller 202 causes a remote video camera to increase the focal length to the displayed object by Y%, thereby decreasing the relative size of the displayed object within the video conference window by a corresponding Y%. For example, issuing the command "In: 23%;" causes a remote camera to zoom in on the object by 23%, while issuing the command "Out: 50%;" causes a remote camera to zoom out from the object by 50%.

Having described video conference system control unit 200 and its associated method of operation, in accordance with the teachings of the present invention, an example implementation will be described in the context of the example video display of a conference manager application depicted in FIGS. 5 and 6, with continued reference to FIGS. 1 and 2. As shown, FIG. 5 represents an example video conference window displayed on local video display unit 118, wherein a number of objects are depicted. In particular, FIG. 5 is an illustrative representation of the display of a conference manager application 500, having menu bar 530 and video conference window 518, cursor control points 502 and cursor 514.

As depicted in the illustrated example conference manager window 500 shown in FIG. 5, video conference window 518 contains a simplistic representation of three individuals 504, 506 and 508 sitting around conference table 512 containing microphone/speaker 510. In accordance with the teachings of the present invention, as presented above with respect to FIGS. 1–4, if a user of local video conferencing station 102 wanted to feature video conference participant 506, the user would manipulate cursor 514 through user input device 116 until it reaches anywhere within participant 506 and issue an interrupt by, for example, pressing a control button located on user input device 116 (e.g., a double click). Upon receiving an interrupt from user input device 116, cursor detect circuit 208 of video conference system controller 110 ascertains the absolute x,y coordinates of the cursor within video conference window 518 of conference manager 500, and provides the cursor position to image analysis circuit 206 via microcontroller 202, as described above. Given the cursor position, image analysis circuit 206 sets a test region immediately surrounding the cursor position, depicted for illustrative purpose only as box 507. Having set the test region, image analysis circuit 206 analyzes the pixels comprising the image within the test region for pixel disparity. Insofar as the pixels within test region 507 all comprise the shirt of conference participant 506, the pixel disparity will be relatively low. In subsequent iterations, image analysis circuit 206 analyzes the pixels within test region 509 and, ultimately 511 before the pixel disparity reaches a predetermined threshold denoting that the selected object has been identified. Having verified, with the user of the local video conferencing station that the image within test region 511 encompasses the desired object, microcontroller 202 calculates the information necessary to adjust the field of focus and the focal length of the remote video camera 132 to center the desired object, within video conference window 518, and to zoom in on participant 506 until it substantially fills video conference window 518.

Figure 6:
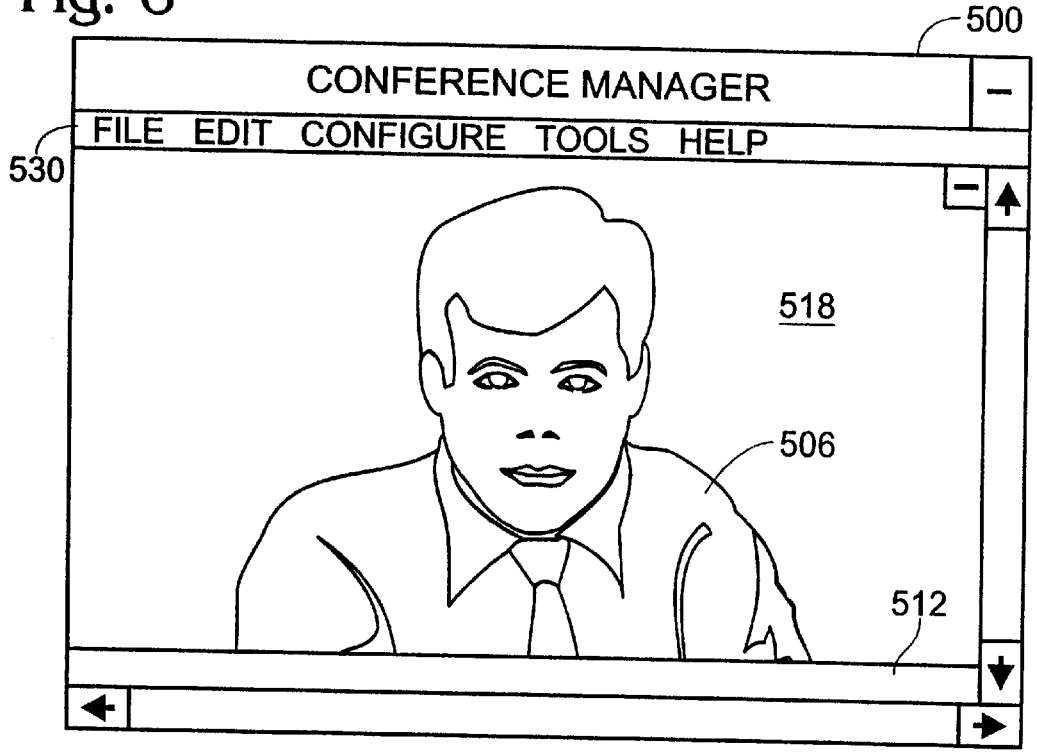
FIG. 6 is an illustration of an example video display of a conference manager application, in accordance with one embodiment of the present invention.

FIG. 6 provides an illustration of the display of conference manager 500 modified to feature the desired object from the video conference window illustrated in FIG. 5. As displayed within FIG. 6, conference participant 506 has been centered within video conference window 518, and the image of conference participant 506 has been increased to substantially fill video conference window 518, in accordance with the teachings of the present invention.

Figure 7:
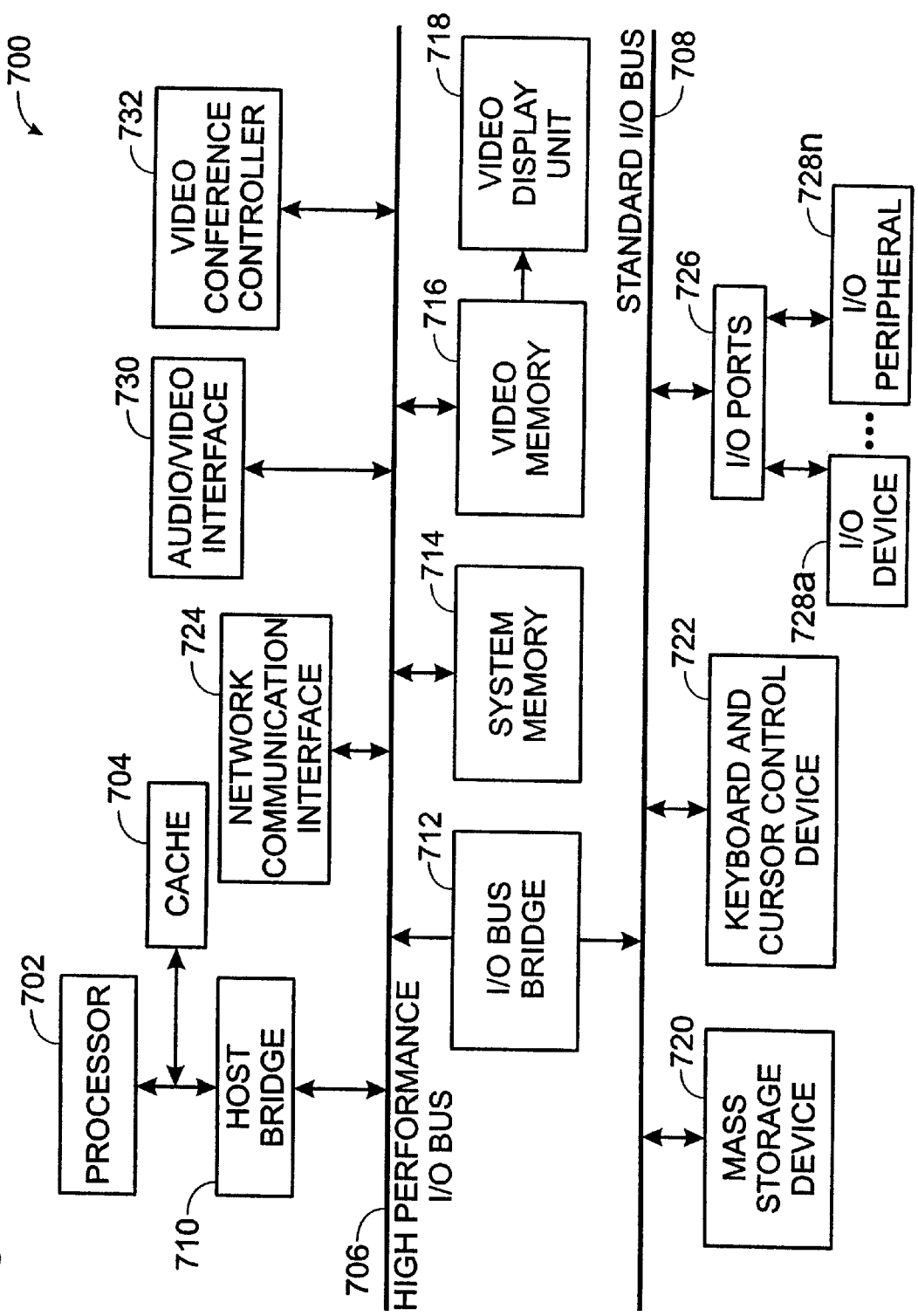
FIG. 7 is a block diagram illustration of an example computer system incorporating the teachings of the present invention, in accordance with one embodiment of the present invention.

Turning to FIG. 7, a block diagram illustrating one embodiment of a computer system (e.g., system 700) incorporated with the teachings of the present invention for automatically controlling a remote video camera is shown. In one embodiment, system 700 is beneficially integrated into video conferencing system 100 as video conference system control unit 102 and/or 120. In accordance with the illustrated example embodiment, system 700 includes at least one processor (e.g., processor 702) and cache memory 704 coupled to each other as shown. Additionally, system 700 includes high performance input/output (I/O) bus 706 and standard I/O bus 708, as shown. Host bridge 710 couples processor 702 to high performance I/O bus 706, whereas I/O bus bridge 712 couples high performance I/O bus 706 to standard I/O bus 708. Coupled to high performance I/O bus 706 are network/communication interface 724, system memory 714, audio/video interface board 730, video conference controller 732 and video memory 716. In turn, display device 718 is coupled to video memory 716. Coupled to standard I/O bus 708 are mass storage device 720 keyboard and pointing device 722, and I/O ports 726. In one embodiment, keyboard and pointing device are coupled to standard I/O bus 708 with a serial communication interface cable, while in alternate embodiments it may be communicatively coupled with an infrared (IR) interface or a radio-frequency (RF) interface.

With continued reference to FIG. 7, elements 702–730 perform their conventional functions as known in the art. In particular, network/communication interface 724 is used to provide communication between system 700 and any of a wide range of conventional networks, such as Ethernet, token ring, the Internet, etc. Similarly, audio/video interface board 730 is used to receive broadcast communications from any of a wide range of conventional wireline and wireless broadcast media such as RF broadcasts, satellite broadcasts, cable broadcasts, etc. Mass storage device 720 is used to provide permanent storage for the data and programming instructions to implement the above described functions, whereas system memory 714 is used to provide temporary storage for the data and programming instructions when executed by processor 702. I/O ports 726 are one or more serial and/or parallel communication ports used to provide communication between additional peripheral devices which may be coupled to system 700 (e.g., stereo speakers, etc.) Collectively, the elements coupled to system 700 are intended to represent a broad category of hardware systems, including but not limited to general purpose computer systems based on the Pentium® processor, the Pentium® Pro processor, or the Pentium® II processor commercially available from Intel Corporation of Santa Clara, Calif.

In one embodiment, video conference controller 732 includes microcontroller 202, cursor detect circuit 208, image analysis circuit 206 and camera drive interface 210. In an alternate embodiment, video conference controller 732 provides the camera drive interface 210, while microcontroller 202 and image analysis circuit 206 are embodied within processor 702, while cursor detect circuit 208 is embodied within keyboard and cursor positioning device 722, respectively, of system 700 of FIG. 7. In one embodiment, system 700 receives an A/V signal via network/communication interface 724 and/or audio/video tuner interface 730, detects an interrupt from a user input device, determines the position of the cursor denoting the object of interest, and analyzes the image pixels within an increasingly large test region in a step-wise fashion until the object has been identified, in accordance with the teachings above. In an alternate embodiment, system 700 receives an A/V signal via an antenna (not shown) coupled to one of I/O ports 726.

It is to be appreciated that various components of system 700 may be re-arranged. For example, cache 704 may be on-chip with processor 702. Alternatively, cache 704 and processor 702 may be packed together as a "processor module", with processor 702 being referred to as the "processor core". Furthermore, mass storage device 720, keyboard and pointing device 722, and/or display device 718 and video memory 716 may not be included in system 700. Additionally, the peripheral devices shown coupled to standard I/O bus 708 may, in alternate embodiments, be coupled to high performance I/O bus 706; or, in some implementations only a single bus may exist with the components of system 700 being coupled to the single bus. Furthermore, additional components may be included in system 700, such as additional processors, storage devices, or memories.

In one embodiment, rather than including a separate video conference controller 732, the innovative features of the present invention discussed above may be implemented as a series of software routines run by system 700 of FIG. 7. These software routines run a plurality or series of instructions to be executed by a processor, such as processor 702 in system 700. Initially, the series of instructions are stored on a storage device, such as mass storage device 720. It is to be appreciated that the series of instructions may be stored on any conventional storage device, such as a diskette, CD ROM, magnetic tape, digital versatile disk (DVD) (also referred to as a digital video disk), laser disk, ROM, flash memory, etc. It is also to be appreciated that the series of instructions need not be stored locally, and could be received from a remote storage device, such as a server on a network, via network/communication interface 724. The instructions are copied from the storage device, such as mass storage device 720, into system memory 714 and then accessed and executed by processor 702. In one embodiment, these software routines are written in the C++ programming language. It is to be appreciated, however, that these routines may be implemented in any of a wide variety of programming languages. In alternate embodiments, the present invention may be implemented in discrete hardware or firmware. For example, an application specific integrated circuit (ASIC) could be programmed with the above described functions of the present invention.

Figure 8:
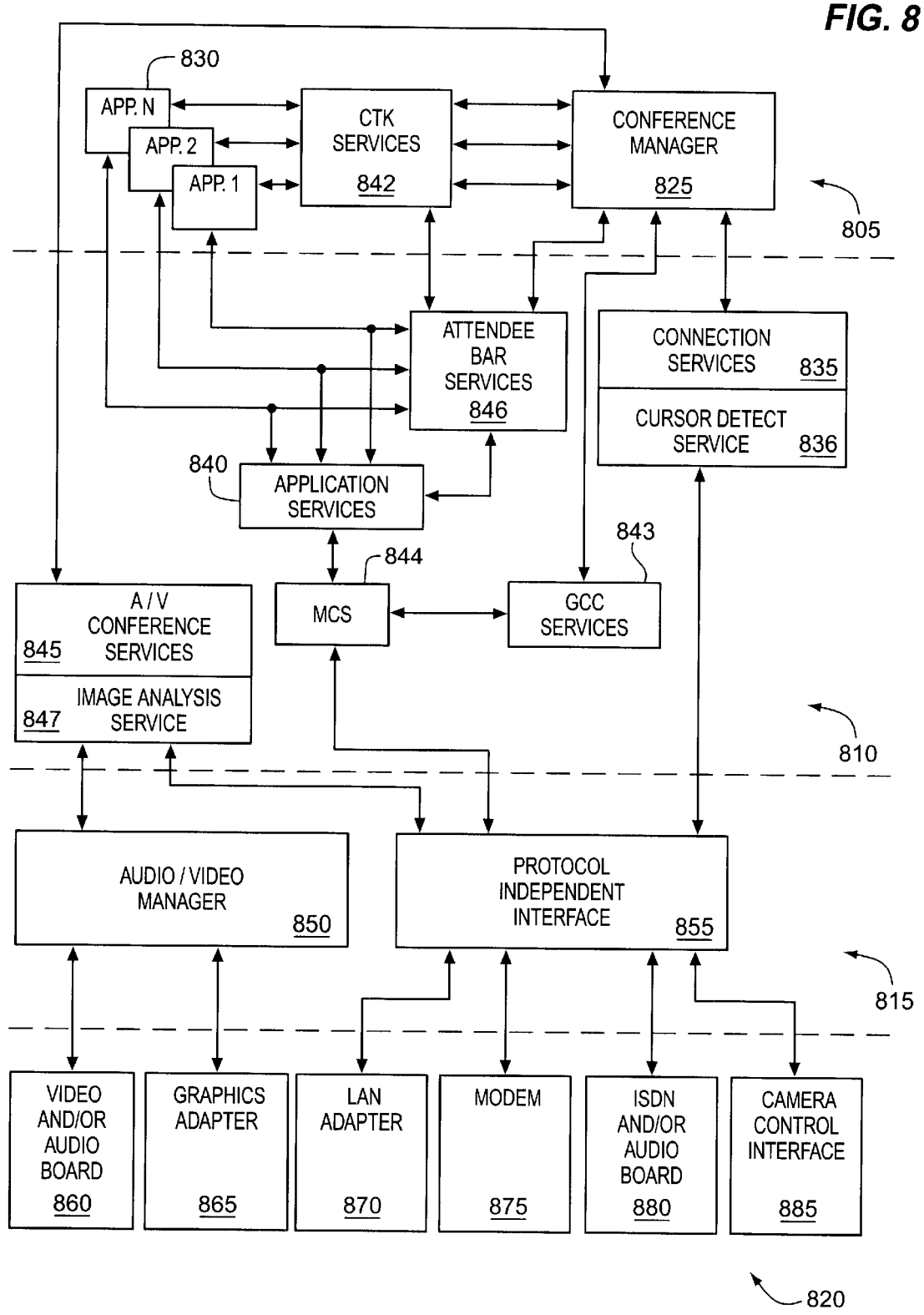
FIG. 8 is an block diagram illustration of an example software architecture for implementing the teachings of the present invention.

One example of a software architecture for automatically controlling a remote video camera in a video conferencing system is depicted in the block diagram of FIG. 8. In accordance with the illustrated example embodiment of FIG. 8, a block diagram showing an architectural overview of conferencing on a video conferencing station, according to one embodiment of the present invention, is depicted. As shown in FIG. 8, the conferencing architecture is separated into multiple layers. These layers are conference application layer 805, conference service layer 810, conference subsystem layer 815, and hardware layer 820.

Conference application layer 805 includes conference manager 825, multiple applications cumulatively referenced as 830, and connection toolkit (CTK) services 842. In accordance with one embodiment of the present invention, conference manager 825 provides a conferencing interface to the user of the video conferencing station (e.g., video conferencing station 102). In addition, conference manager 825 calculates positioning information for the remote video camera based, at least in part, on information provided by image analysis service 847, described below, and issues camera control commands via an appropriate communication channel interface selected from hardware interface layer 820. In one embodiment, the conferencing interface is a graphical user interface (GUI) such as, for example, the conference manager 500 depicted in FIGS. 5 and 6, above. In one implementation, conference manager 825 includes options, such as through a menu, which allows the user to add or delete applications to the conference.

Applications 830 represent any of a wide variety of conventional software applications. In one embodiment of the present invention, one of the applications 830 is a notebook application which allows users to input text and/or drawings for the conference. In one implementation, additional applications are, for example, application sharing software, a high-quality image sharing application(s), or a file transfer application(s). It is to be appreciated that any number of applications can be executed at an appropriately configured video conferencing station.

CTK services 842 provides an interface which allows messages to be transferred between applications 830 and conference manager 825. CTK services 842 also provides an interface which allows messages to be transferred between attendee bar services 846 and conference manager 825.

Conference application layer 805 is coupled to conference service layer 810. Conference service layer 810 includes connection services 835, application services 840, generic conference control (GCC) services 843, multipoint communication services (MCS) 844, audio/video conference services 845, and attendee bar services 846. Connection services 835 establishes and maintains connections with the other video conferencing station(s). Connection services 835 interfaces between the conference subsystem layer 815 and conference manager 825 when establishing connections which are initiated by either this video conferencing station or another video conferencing station. As depicted, connection services 835 is shown comprising cursor detect service 836. As described above, cursor detect service 836 calculates the x,y position of a cursor upon receiving an appropriate interrupt from a user input device. In one embodiment, connection services 835 also includes address book services which provide services related to managing connection addresses for conference participants.

Application services 840 provides an interface between applications 830 and conference subsystem layer 815. Application services 840 also provides an interface between applications 830, and GCC services 843 and MCS 844. In one implementation, application services 840 also prevents one application from unfairly dominating the communication services of lower layers.

GCC services 843 maintains a record of the applications 830 which are executing on the video conferencing station and provides registry services to allow applications 830 to register with GCC services 843. In addition, GCC services 843 also maintains a record of current conference participants.

MCS 844 provides support for full-duplex multipoint communication among an arbitrary number of connected application entities over a variety of conventional networks. In one implementation, MCS 844 provides multipoint message routing and message broadcasting. The multipoint message routing ensures that the other video conferencing stations all receive messages from this system in the same order, and identifies the shortest path to each of the other video conferencing stations. Message broadcasting allows connection information to be broadcast to all video conferencing stations in the conference.

Audio/Video conferencing services 845 provides an interface between conference subsystem layer 815 and conference manager 825. Audio/Video services 845 provide audio and video services to conference application layer 805, such as capture and playback services for video streams. Accordingly, in one embodiment of the present invention, A/V conferencing services 845 includes image analysis services 847 incorporating the teachings of the present invention. That is to say, in accordance with the teachings of the present invention described above, image analysis services 847 analyzes the image stored in a capture buffer (not shown) to automatically identify an object selected by a user of conference manager 825. Once the object is identified, image analysis service 847 determines the center of the object, along with the minimum and maximum x,y coordinates. Image analysis service 847 supplies conference manager 825 with the center coordinates and the minimum/maximum x,y coordinates, from which conference manager 825 calculates positioning information for the remote video camera. As described above, conference manager 825 issues commands to control the remote video camera via an appropriate communication channel interface selected from hardware interface layer 820.

Attendee bar services 846 provides support for the associating of user information with conference participants of the present invention. In one embodiment, attendee bar services 846 is a library of function calls which are available to the applications executing at a video conferencing station.

Conference subsystem layer 815 operates in a conventional manner to provide an interface between the protocol-independent conference service layer 810 and the specific protocols of the devices in hardware layer 820. Audio/video manager 850 provides an interface which receives audio and video data from audio/video conference services 845 and outputs it to the hardware layer 820 for display or audio play.

Protocol independent interface 855 provides an interface between the components of conference service layer 810 and hardware layer 820. Interface 855 receives data and messages from the components of conference service layer 810 and converts the information received to the proper format based on the hardware connected to the system.

Hardware interface layer 820 includes video and/or audio board 860, graphics adapter 865, LAN adapter 870, communications adapter (e.g., Modem) 875, ISDN and/or audio board 880 and camera control interface 885. The video and/or audio board 860 and graphics adapter 865 are conventional computer system boards for realizing video and/or audio outputs. For example, the video outputs may be realized on a display device and the audio outputs may be realized via a computer system speaker. The video and/or audio board 860 and graphics adapter 865 also provide sampling, digitization, compression/decompression of audio signals exchanged between two video conferencing stations over a full-duplex audio connection, as well as interfacing with the proper CODEC to compress and decompress the video signals. Camera control interface 885 interfaces with a local video camera.

Hardware layer 820 also includes a LAN adapter 870, communications adapter 875, and ISDN and/or audio board 880. LAN adapter 870 is a conventional LAN adapter, such as an Ethernet adapter. Communications adapter 875 is a conventional line for coupling the video conferencing station to a POTS line. ISDN and/or audio board 880 is a conventional ISDN line which can also include audio support.

It is to be appreciated that, depending on the conferencing environment, all of the components of hardware layer 820 may not be included. For example, LAN adapter 870 may not be included in one of the video conferencing stations.

Figure 9:
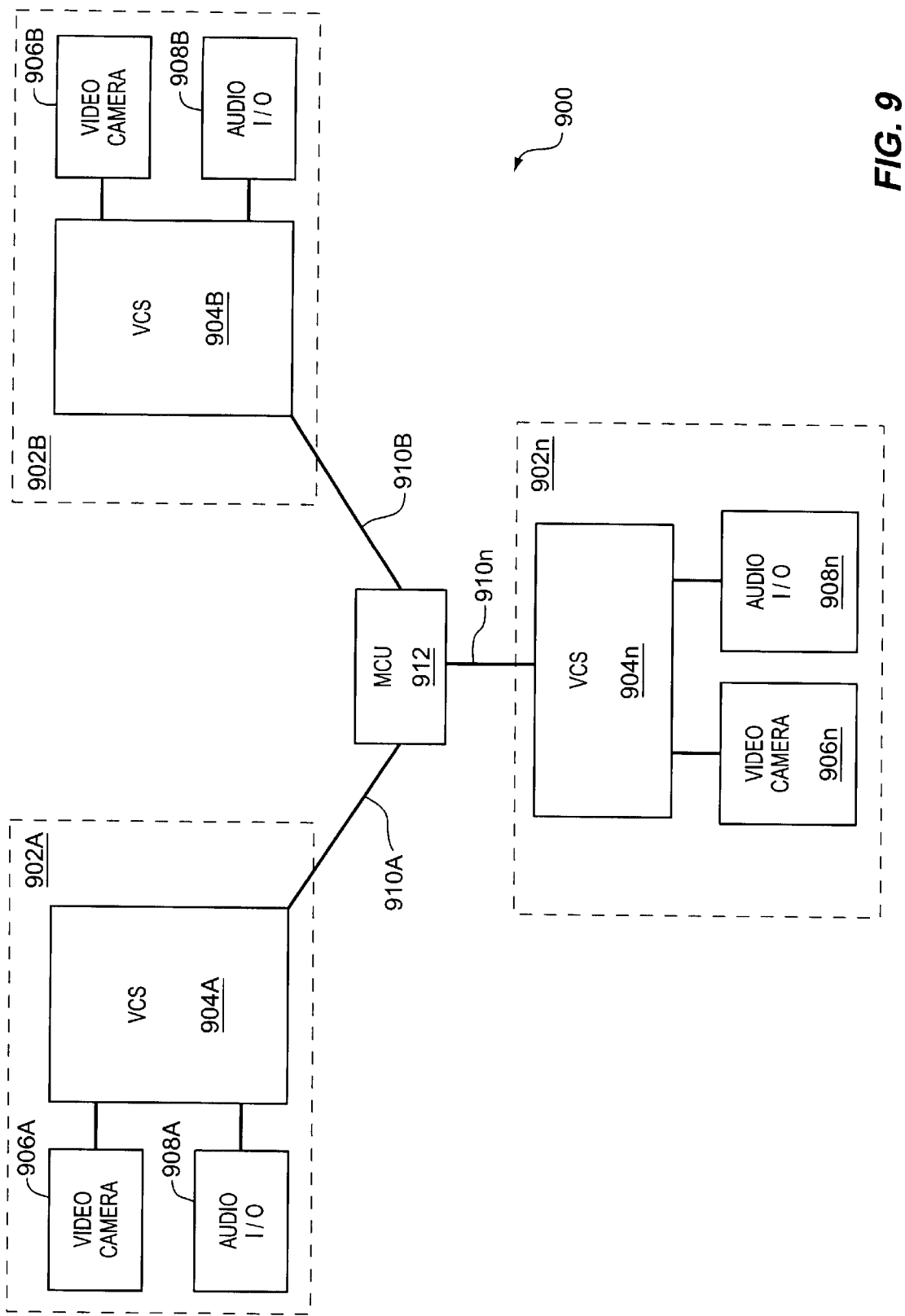
FIG. 9 is a block diagram illustration of an example video conferencing system incorporating the teachings of the present invention, in accordance with an alternate embodiment of the present invention.

While the teaching of the present invention were described above as being incorporated into each of the video conferencing stations comprising video conference system 100, those skilled in the art will appreciate that this need not be the case. FIG. 9, for example, depicts a video conference control system 900 comprising video conferencing stations 902a, 902b through 902n, each of which communicatively coupled to a common multipoint control unit (MCU) 912 incorporated with the teachings of the present invention, in accordance with an alternate embodiment of the present invention. In accordance with the illustrated example embodiment of FIG. 9, MCU 912 incorporated with the teachings of the present invention receives interrupts from any of the plurality of video conference system control units 904a through 904n, and adjusts the focal length and field of focus for select remote video camera's 906a through 906n, as described above. That is, MCU 912 identifies an indication from one of the conference participants to adjust the position of a remote camera, identifies the object to be featured, and issues commands to the remote camera to adjust the field of focus form the remote camera and/or the focal length of the remote camera as described above. However, rather than each of the video conferencing station incorporating the teachings of the present invention, conferencing system 900 employs one network element incorporating the teachings of the present invention (e.g., MCU 912).

Thus, alternative examples of a method and apparatus for controlling a remote video camera have been described, above, with respect to FIGS. 1 through 9. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. A teleconferencing apparatus comprising:
   an analysis module capable of determining a focused image, the focused image comprising a subset of pixels of a single video image stored in a capture buffer, by iteratively enlarging the focused image until a level of disparity between the pixels of the focused image exceeds a threshold value; and
   a control module capable of controlling a remote video camera to adjust the camera to the focused image.

2. The apparatus of claim 1, wherein a user input causes the single video image to be stored in the capture buffer.

3. The apparatus of claim 2, wherein the user input further includes pixel coordinates that determine a position of the focused frame that is iteratively enlarged by the analysis module.

4. The apparatus of claim 3, wherein the user input comprises activating an event on a pointing device, wherein the image displayed when the event was activated comprises the single video image to be stored in the capture buffer, and the position of the pointing device at when the event was activated comprises the pixel coordinates.

5. The apparatus of claim 4, wherein the pointing device comprises a mouse and the event on the mouse comprises a double-click.

6. The apparatus of claim 1, wherein the single video image comprises one frame of a video data stream comprising sequential frames of video data.

7. The apparatus of claim 1, wherein the level of disparity between the pixels of the focused frame comprises a measure of the standard deviation of one or more pixel attributes.

8. The apparatus of claim 7, wherein the one or more pixel attributes comprise at least one of pixel color, pixel hue, pixel brightness, and pixel texture.

9. The apparatus of claim 1, wherein the control module adjusts the remote video camera by adjusting a focal length of the remote video camera.

10. A computer readable medium having stored thereon instructions which when executed by a processor cause the processor to:
    cause an analysis module to determine a focused image, the focused image comprising a subset of pixels of a single video image stored in a capture buffer, by iteratively enlarging the focused image until a level of disparity between the pixels of the focused image exceeds a threshold value; and
    cause a control module to adjust a remote video camera to the focused image.

11. The computer readable medium of claim 10, wherein a user input causes the single video image to be stored in the capture buffer.

12. The computer readable medium of claim 11, wherein the user input further includes pixel coordinates that determine a position of the focused frame that is iteratively enlarged by the analysis module.

13. The computer readable medium of claim 10, wherein the user input comprises activating an event on the pointing device, wherein the image displayed when the event was activated comprises the single video image to be stored in the capture buffer, and the position of the pointing device at when the event was activated comprises the pixel coordinates.

14. The computer readable medium of claim 10, wherein the pointing device comprises a mouse and the event on the mouse comprises a double-click.

15. The computer readable medium of claim 10, wherein the single video image comprises one frame of a video data stream comprising sequential frames of video data.

16. The computer readable medium of claim 10, wherein the level of disparity between the pixels of the focused frame comprises a measure of the standard deviation of one or more pixel attributes.

17. The computer readable medium of claim 10, wherein the one or more pixel attributes comprise at least one of pixel color, pixel hue, pixel brightness, and pixel texture.

18. A method performed by a teleconferencing apparatus, the method comprising:
    determining a focused image, the focused image comprising a subset of pixels of a single video image stored in a capture buffer, by iteratively enlarging the focused image until a level of disparity between the pixels of the focused image exceeds a threshold value; and
    adjusting a remote video camera to the focused image.

19. The method of claim 18, further comprising receiving a user input, and storing the single video image in the capture buffer in response to the user input.

20. The method of claim 19, wherein the user input includes pixel coordinates that determine a position of the focused frame that is iteratively enlarged.

* * * * *

UNITED STATES PATENT AND TRADEMARK OFFICE
CERTIFICATE OF CORRECTION

PATENT NO. : 6,614,465 B2
DATED : September 2, 2003
INVENTOR(S) : Alexander et al.

It is certified that error appears in the above-identified patent and that said Letters Patent is hereby corrected as shown below:

Column 5,
Line 8, delete "fill", insert -- full --.

Signed and Sealed this

Twenty-fifth Day of May, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,614,465 B2 | Page 1 of 1 |
| APPLICATION NO. | : 09/982675 | |
| DATED | : September 2, 2003 | |
| INVENTOR(S) | : Theresa A. Alexander et al. | |

It is certified that error appears in the above-identified patent and that said Letters Patent is hereby corrected as shown below:

Title Page: Item 22 delete, "Filed: Sep. 13, 2001" insert -- Filed October 18, 2001 --.

Signed and Sealed this
Twenty-ninth Day of March, 2016

Michelle K. Lee
*Director of the United States Patent and Trademark Office*